United States Patent
Krell et al.

(10) Patent No.: US 7,105,224 B2
(45) Date of Patent: Sep. 12, 2006

(54) OXIDE CERAMIC FIBER COMPOSITE MATERIALS AND USE THEREOF

(75) Inventors: Andreas Krell, Dresden (DE); Dieter Sporn, Würzburg (DE); Paul Blank, Dresden (DE)

(73) Assignee: Fraunhofer-Gesellschaft Zur Foerderung Der Angewandten Forschung E.V., München (DE)

( * ) Notice: Subject to any disclaimer, the term of this patent is extended or adjusted under 35 U.S.C. 154(b) by 0 days.

(21) Appl. No.: 10/849,798

(22) Filed: May 21, 2004

(65) Prior Publication Data

US 2005/0003183 A1  Jan. 6, 2005

Related U.S. Application Data

(63) Continuation of application No. PCT/DE02/04259, filed on Nov. 14, 2002.

(30) Foreign Application Priority Data

Nov. 23, 2001  (DE) ................. 101 58 925

(51) Int. Cl.
*B32B 11/105* (2006.01)
(52) U.S. Cl. ................. 428/332; 428/293.4; 428/294.1; 428/359; 428/364; 428/401; 428/403
(58) Field of Classification Search ................. 428/408, 428/293.4, 294.1, 446, 494.1, 332, 359, 364, 428/401, 403; 188/355, 73.1, 370, 255, 71.1
See application file for complete search history.

(56) References Cited

U.S. PATENT DOCUMENTS

| | | | |
|---|---|---|---|
| 4,490,505 A | 12/1984 | Pendergrass, Jr. | |
| 4,828,880 A | 5/1989 | Jenkins et al. | |
| 5,024,859 A | 6/1991 | Millard et al. | |
| 5,322,823 A | 6/1994 | Ueda et al. | |
| 5,436,042 A | 7/1995 | Lau et al. | |

(Continued)

FOREIGN PATENT DOCUMENTS

CA  2272075  11/1999

(Continued)

OTHER PUBLICATIONS

Kolchin et al., "Oxide/oxide composites with fibres produced by internal crystallization", Composites Science and Technology 61, (2001) 8, pp. 1079-1082.

(Continued)

*Primary Examiner*—Merrick Dixon
(74) *Attorney, Agent, or Firm*—Greenblum & Bernstein, P.L.C.

(57) ABSTRACT

The invention relates to oxide ceramic fiber composite materials that, e.g., according to the invention, are used in energy conversion installations. The present invention discloses a fundamentally new concept for the previously incompatible requirements of improved brittle fracture behavior to secure thermal shock stability and damage tolerance in the temperature range of <1000° C. and of mechanical high-temperature stability to guarantee long-term form stability (creep resistance) of components. This is attained through oxide ceramic fiber composite materials containing fibers with a monocrystalline structure in some areas with an average coherence length of $\geq 150$ μm, with a mesoscopically resistant fiber/matrix interface along the fiber axis at high temperature, which interface on loading above room temperature in a way associated with the propagation of macrocracks shows delaminations that in their extension along the fiber axis are limited microscopically locally to values smaller than the average fiber coherence length and thereby limited to a maximum of 200 μm. The present invention is also directed to the use of the fiber composite materials for components and/or installations for long-term use at high temperatures.

7 Claims, 2 Drawing Sheets

Fracture at 900°C.

U.S. PATENT DOCUMENTS

| | | | |
|---|---|---|---|
| 5,567,518 | A | 10/1996 | Pejryd et al. |
| 5,856,252 | A | 1/1999 | Lange et al. |
| 5,993,715 | A | 11/1999 | Park |
| 6,139,916 | A | 10/2000 | Saruhan-Brings et al. |
| 6,251,317 | B1 | 6/2001 | Lundberg et al. |
| 6,505,556 | B1 | 1/2003 | Miyauti |
| 6,605,556 | B1 | 8/2003 | Bose |
| 6,719,104 | B1 * | 4/2004 | Wemple et al. ............ 188/73.1 |
| 6,855,428 | B1 * | 2/2005 | Lau et al. ................... 428/408 |

FOREIGN PATENT DOCUMENTS

| | | |
|---|---|---|
| DE | 4036386 | 5/1991 |
| DE | 10158925 | 6/2003 |
| EP | 0639165 | 4/1981 |
| EP | 0275662 | 11/1990 |
| EP | 0039165 | 2/1992 |
| EP | 0639165 | 2/1995 |
| EP | 0890559 | 1/1999 |
| EP | 0946458 | 10/1999 |
| EP | 0946458 | 11/2001 |
| EP | 0890599 B1 | 9/2002 |
| FR | 2778655 | 11/1999 |
| WO | 95/35268 | 12/1995 |
| WO | 03/045874 | 6/2003 |

OTHER PUBLICATIONS

Gadow, "Current Status and Future Prospects of CMC Brake Components and Their Manufacturing Technologies", Ceramic Eng. & Sci. Proceedings, vol. 21, No. 3, pp. 15-29 (2000).

Donald et al., "Review Ceramic-matrix composites", Journal of Materials Science, vol. 11, pp. 949-972 (1976).

Evans, "Creep and Fracture of Engineering Materials and Structures", Proceedings of the Third International Conference held at University College, Swansea, pp. 929-956 (1987).

* cited by examiner

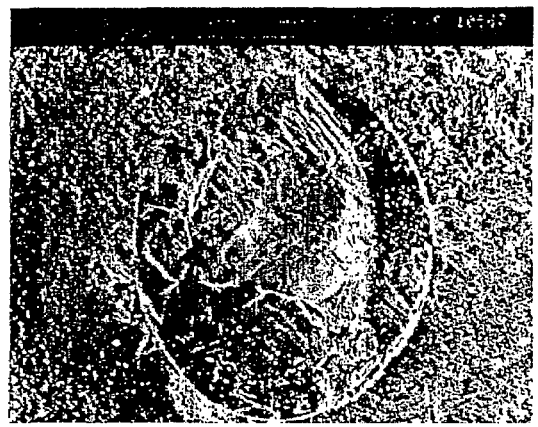
Fig. 1: Room temperature fracture—overview.
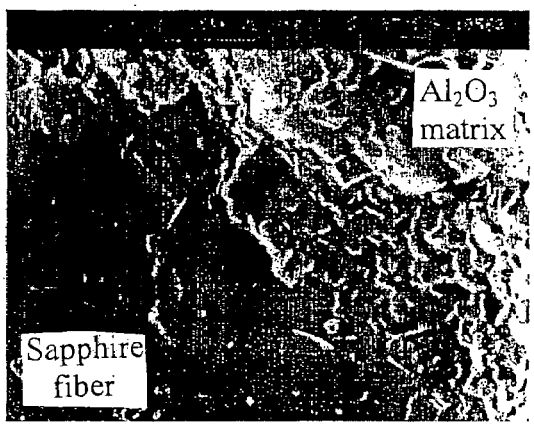
Fig. 2a
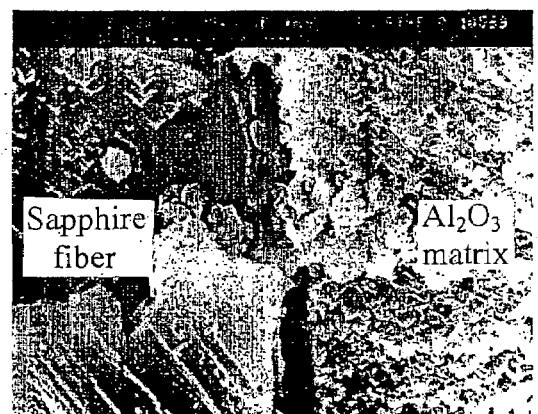
Fig. 2b
Fig. 2: Room temperature facture—details

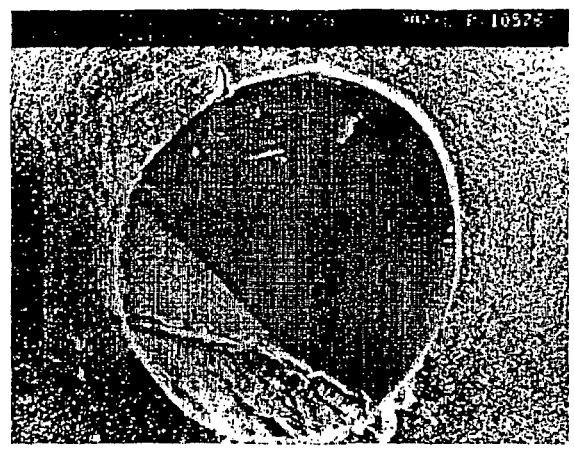
Fig. 3: Fracture at 900°C.
Fig. 4a
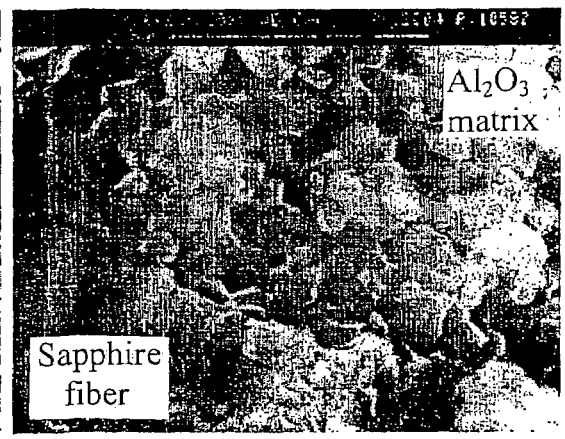
Fig. 4b
Fig. 4: Fracture at 1200°C.

OXIDE CERAMIC FIBER COMPOSITE MATERIALS AND USE THEREOF

CROSS-REFERENCE TO RELATED APPLICATIONS

The present application is a continuation of International Application No. PCT/DE02/04259, filed Nov. 14, 2002, the disclosure of which is expressly incorporated by reference herein in its entirety, and claims priority of German Patent Application No. 101 58 925.5, filed Nov. 23, 2001.

BACKGROUND OF THE INVENTION

1. Field of the Invention

The invention relates to oxide ceramic fiber composite materials as used, e.g., according to the invention in energy conversion installations.

2. Discussion of Background Information

In the interest of energy outputs to be substantially increased in the future, greatly increased efforts are to be observed to provide ceramic materials for energy production installations at temperatures $\geq 1400°$ C. Concurring assessments thereby assume that for load-bearing components under such extreme conditions:

It will be possible to realize both an adequate damage tolerance (i.e., thermal shock stability and high room temperature fracture toughness of the actually brittle ceramics) and the required creep stability of the components only by means of a fiber-composite design, and The problem of thermodynamic high-temperature stability in oxidizing atmospheres can be permanently mastered only with oxide ceramics that are oxidation-stable per se.

High-performance brake disks have to meet similarly differentiated requirements regarding damage tolerance, temperature stability and corrosion stability. Currently the mechanical and thermophysical requirements are best met by composites of carbon long fibers with reaction bonded SiC matrix. However, the corrosion resistance of these composites is limited due to corrosion progressing along the non-oxide fibers into the interior of the disks. It was observed that, although the use of carbon short fibers improves corrosion stability, it limits the mechanical property level (R. Gadow, p. 15–29 in: Ceram. Eng. Sci. Proc. Vol. 21/3, The Am. Ceram. Soc., Westerville/OH, 2000). Purely oxidic composites could therefore provide an advantageous alternative material here too.

In view of the complex mechanical requirements, it is evident with the above assessments for all such uses that the mechanical properties of the fiber/matrix bond are of decisive importance in realizing such oxidic composite materials. However, it is also evident why it has hitherto been impossible to develop a concept that meets the demands for thermal shock stability and for creep resistance equally:

The requirement for transferring the creep resistance of a (preferably multi-dimensional) fiber structure to the component as a whole, at least in view of a long-term use of $\geq 10,000$ hours, leads to the obvious requirement for a strong fiber/matrix bond (I. W. Donald et al., J. Mater. Sci. 11(1976) 5, 949–972); A.G. Evans et al., p. 929–956 in Creep and Fracture of Engineering Materials, London, 1987). Although one could hope through a multi-dimensional fiber design to achieve a certain macroscopic form stability of the parts even without a strong fiber/matrix bond solely through a high creep resistance of the fiber arrangement, very complex stresses (also with regard to an erosion stress) exist in turbines under the conditions of flowing atmospheres and high pressure gradients, which composite materials with generally weak interfaces can hardly hold out for longer periods at temperatures about 1400°C.

In contrast, the requirement for a ceramic that is repeatedly thermal shock-resistant seems currently to be realizable exclusively by a composite design that realizes a consumption of (brittle) fracture energy (energy dissipation) after strain and partial fracture of fibers by means of a considerable shearing deformation along the fiber/matrix interfaces (crack deflection, "pull-out" or "debonding" effects, rendered possible by weak fiber/matrix bond).

In implementing this realization a number of proposals have been made which all without exception contain formation of weak fiber/matrix interfaces. This is carried out in part by fiber coating and in part by a corresponding design of the matrix.

Pejryd et al. (EP 639 165 A1, U.S. Pat. No. 5,567,518) thus describe "a ceramic composite particularly for use at temperatures above 1400° C." with a structure of oxide fiber/oxide matrix and a material selection determined by claim and, if necessary, larger coating thickness of the fibers >7 μm such that expressly weak interfaces ("weak bond liable to debonding") are achieved. As in most of the proposals known from the literature, however, the real usefulness for the declared application is not disclosed here either: the "proof" of an energy consumption during fracture (in the form of non-linear stress-strain effects) occurs in the examples only through tests at room temperature, which does not allow any conclusions to be drawn regarding real thermal shock behavior or certainly regarding creep stability with the uses above 1400° C. given as the object.

Saruhan-Brings et al. (EP 890 559 A1) describe a "Process for coating oxidic fiber materials for producing failure-tolerant, high-temperature resistant, oxidation-resistant composite materials." As an example a La aluminate coating on polycrystalline $Al_2O_3$ fiber is bonded to a mullite matrix. No high-temperature tests or their results are disclosed. The same defect is shown by the patent of Lange et al. (U.S. Pat. No. 5,856,252) where within the scope of "damage-tolerant ceramic matrix composites by a precursor infiltration" a claim describes an "all oxide ceramic composite" of uncoated $Al_2O_3$ fibers and porous mullite matrix without disclosing information on the high-temperature behavior; the main content of U.S. Pat. No. 5,856,252 is the description of oxidic composites with damage-tolerant behavior achieved through "delaminations . . . with extensive regions of cracking normal to the rupture plane."

A similar approach is found with Dariol et al. in a "processing method for an interphase material, material obtained, treatment process of a ceramic reinforcement fiber with this material and thermostructural material including such fibers" (FR 27 78 655 A1), where the formation of a microporous fiber/matrix interface area occurs through the use of a pore-forming additive (e.g., carbon that is at least partially oxidized). Lundberg et al. (EP 946 458 A1) have obtained a similar microstructural result. They produced microporous fiber/matrix interfaces for oxide fiber/oxide matrix composites, intended specifically for use in oxidizing atmospheres >1400° C. by immersing the fibers in powder slurry containing carbon and $ZrO_2$.

The proposed solutions thereby overlook the fact that the creep rates particularly of the oxides in question between 1300° C. and 1700° C. increase by approx. 4 orders of magnitude (many non-oxide ceramics are more creep resistant, but are thereby oxidation-susceptible) so that an adequate mechanical long-term stability (≧10,000 h) will be completely impossible to realize with polycrystalline fibers in polycrystalline matrices.

The present invention is therefore based exclusively on composites of oxide ceramic materials with monocrystalline fibers at least in some areas whose average coherence lengths of the monocrystalline areas are at least 150 μm, preferably ≧400 μm, in particular preferably ≧1 mm. Surprisingly, in the above-referenced publications only in EP 639 165 A1 is there an exemplary embodiment that meets this requirement in that thick monocrystalline sapphire fibers (Saphikon, USA; fiber thickness ≧100 μm) are coated with $ZrO_2$ and embedded in an $Al_2O_3$ matrix. However, EP 639 165 also lacks any information on the actual behavior under temperature stress relevant as a target value. Also with use or in-situ production of monocrystalline fibers, the concept of weak interfaces is adhered to with the consequence that in the range of low temperatures the fibers tend to reduce rather than improve strengths (A. A. Kolchin et al., Composite Sci. Technol. 61 (2001)8, 1079–1082).

The previously known proposed solutions therefore have in common that even in the case of a target definition for use at temperatures ≧1400° C., the development of properties is oriented exclusively to the thermal shock stress relevant only at lower temperatures and that no disclosure is made of the material properties even here. All known developments have as their goal microstructural construction according to "damage-tolerant" behavior which is realized by weak fiber/matrix interfaces. Incomprehensibly, the achievement of this object is not proven in any case by corresponding thermal shock tests in technically relevant temperature ranges; instead all the listed exemplary embodiments are limited to simply room temperature fracture tests.

When this "weak" fiber/matrix bond is produced by bond-weakening fiber coatings with suitable materials or through artificially produced micropores, it is still overlooked that such micropores in the target use temperature range become unstable, at least in long-term use, and that the bond-weakening effect of a fiber coating is also quite different at higher temperatures, such as, e.g., at 1400° C., than at the room temperature range exclusively tested.

Of course "weak" fiber/matrix interfaces also cannot meet the dominant requirement for creep stability particularly at ≧1400° C.

Therefore, the known approaches for oxide ceramic fiber composite materials for use at temperatures ≧1400° C. do not provide a practical solution or even a hint for the thermal shock stresses associated with heating up/cooling down, or for the serious problem at such high temperatures of creep deformation.

SUMMARY OF THE INVENTION

The present invention relates to providing a fundamentally new concept for solving the two previously incompatible requirements for (1) improved brittle fracture behavior to ensure thermal shock stability and damage tolerance in the temperature range <1000° C., and (2) mechanical high-temperature stability to guarantee long-term form stability (creep resistance) of components of such oxide ceramic composite materials.

The present invention relates to oxide ceramic fiber composite material containing fibers with a segmented monocrystalline structure with an average coherence length of ≧150 μm, with a mesoscopically strong fiber-matrix interface along the fiber axis at high temperature, exhibits, on loading during stresses above room temperature in a way associated with propagation of macrocracks (e.g. brittle fracture, thermal shock), delaminations (debonding processes) that along the fiber axis are microscopically (locally) limited to values smaller than the average fiber coherence length and thereby limited to a maximum of 200 μm.

The oxide ceramic fiber composite material can contain coated fibers with a thickness of interface material of less than 2 μm.

The present invention is also related to thermally or long-term highly stressed components and/or installations comprising the oxide ceramic fiber composite material according to the present invention.

The present invention is also directed to components and/or installations under changing thermal and/or long-term stresses comprising the oxide ceramic fiber composite material according to present invention.

The present invention is also directed to components and/or installations for energy conversion or for high-performance brake disks comprising the oxide ceramic fiber composite material according to the present invention.

DETAILED DESCRIPTION OF THE INVENTION

The oxide ceramic fiber composite materials according to the invention which contain fibers with a monocrystalline structure at least in some areas (average length of the monocrystalline "coherent" areas of the fiber at least 150 μm, preferably ≧400 μm, particularly preferably ≧1 mm) are characterized in that the fiber/matrix interfaces show a strong bond over the average fiber coherence length in mesoscopic length areas along the fiber axis under high-temperature stress, whereby on loading above room temperature in a way associated with the propagation of macrocracks (brittle fracture, thermal shock), this bond exhibits only microscopic delaminations (debonding) limited locally to areas smaller than the given coherence length and thereby no more than 200 μm, and thus prevents a quasi-macroscopic debonding of the fibers upon fracture (pull out) as well as extensive creeping of the interface in the high temperature range.

According to the invention, the concept of a mesoscopically strong fiber/matrix interface over the fiber coherence length along the fiber axis means that no continuous tearing of the matrix from the fiber ("pull-out" in the axial direction) occurs under thermomechanical stress with a crack dimension exceeding the average coherence length of the fiber and thereby no more than 200 μm. Whereas "delaminations . . . with extensive . . . cracking" (U.S. Pat. No. 5,856,252) are thus avoided here, locally limited separations do occur throughout in microscopic areas that are smaller than the average coherence length of the fibers and thereby no more than 200 μm. However, this microscopically locally limited delamination cannot thereby lead to longer pull-out effects of the fibers in the fracture surface because of the mesoscopically strong interface bond in the axial direction of the fibers. The pull-out lengths that may be observed on fracture surfaces remain small compared to the given minimum coherence length of 150 μm and never exceed an average value of 200 μm.

This representation also shows that a blanket qualification of the fiber/matrix interfaces as "strong" or "weak" does not make much sense due to the different temperature ranges and without specifying the length dimensions considered. Thus, in view of its microscopic delamination in the temperature range of brittle material behavior (≦1000° C.), the fiber/ matrix bond described above as mesoscopically strong on the one hand can be termed relatively weak in this temperature range compared with the possibly stronger character enabling creep resistance of the same interface in the high temperature range above 1000° C. On the other hand, however, in the range ≦1000° C. this fiber/matrix interface is certainly relatively "strong" compared with other interfaces that, as described according to the prior art, lead to separation lengths of multiples of the fiber diameter during fracture. Surprisingly, the energy dissipation of composites according to the invention associated with microscopically local fiber separation is sufficient to greatly influence the brittle fracture processes as they determine strength and thermal shock resistance in the temperature range ≦1000° C. The hitherto insurmountable conflict between the requirements of mastering the mechanical behavior in this low temperature range and of form stability (creep resistance) and structural cohesion (e.g., in view of erosion stability) at very high temperatures has been solved for the first time with the design according to the invention for purely oxidic fiber composite materials.

The material selection and the production technology are of less importance compared with the fundamental design according to the invention of the composite concept. The use of materials known to be creep resistant, such as mullite or Y—Al garnet for matrix and fibers generally provides advantages. Additional measures for structural control under long-term high-temperature stresses can also be useful (thus, the use of special doping, of duplex or generally multi-phase matrix materials for preventing or limiting grain growth). The respective selection of the basis material for matrix and fibers and/or additives, however, is always determined by the respective use and is not subject to any restrictions within the scope of the composite design according to the invention described here. The material selection of any fiber coating within the scope of the design concept disclosed here can also take place within a broad framework, because the material of the fiber/matrix interface only establishes the first prerequisites for matching the essential characteristics of the new composite design: the actual development of a mesoscopically strong fiber/matrix interface according to the invention (i.e. of an interface which when stressed above room temperature in a way associated with the propagation of macrocracks (fracture, thermal shock) shows microscopically locally limited delaminations (debonding)), takes place only through the coordination of this material selection with other previously known process steps (such as, e.g., the production of an optimized sintering degree of the matrix by varying the sintering temperature).

If coated fibers are used, the thickness of the coating must be kept <2 μm, in order to realize the mesoscopically strong bond according to the invention.

Of course, it is also unimportant whether the composite is produced with the use of a prefabricated monocrystalline oxide ceramic fiber with the given coherence lengths or of polycrystalline fibers, tissues or other fibrous preforms that are only converted into the monocrystalline state described according to the invention in the course of the sintering of the composite (e.g., produced through impregnation) in situ.

The present invention can be used in a particular manner for thermally highly stressed and/or also long-term highly stressed components or installations. They can further be used advantageously for components that are used under particular with changing thermal and/or long-term stresses. These composites are advantageous in particular for components and/or installations for energy conversion or for high-performance brake disks.

The invention is described below in more detail on the basis of an exemplary embodiment.

Sapphire fibers with approx. 160 μm diameter (Advanced Crystal Products, USA) were coated per the sol-gel process with 0.15–1.2 μm thick SrO.6Al$_2$O$_3$ layers and were compacted then together with a corundum powder of high purity (>99.99% Al$_2$O$_3$) and 0.2 μm average grain size (TM-DAR, Boehringer Ingeiheim Chemicals, Japan) in a hot press into flat plates of approx. 5 mm thickness. The properties of fiber-free samples were also tested for comparison. The influence of the fiber thickness is not shown here; however, advantageously in general thin fibers are to be used.

For the exemplary tests a relatively large fiber spacing of approx. 1–1.5 mm was established; the dimension of the samples was 3.6×6.8×60 mm$^3$. The fibers were aligned parallel to the longitudinal axis of the bending fracture rods and thus oriented perpendicular to the developing (macroscopic) fracture surfaces.

The grain size of the matrix of the produced dense oxide ceramic fiber composites was changed through different hot press temperatures; such an adjustment of the grain size of the matrix is significant especially for mechanical stability at very high temperature:

| | |
|---|---|
| 1330° C./2 h | 0.6 μm, |
| 1550° C./2 h | 6.0 μm, |
| 1800° C./2 h | 15.5 μm. |

All mechanical tests in the range of room temperature up to 1400° C. were carried out in 3-point bending with a stress rate of 0.5 mm/min; previously no influence on the stress rate, the packing density of the fiber or of an additional hot isostatic secondary compression of the composites was determined in preliminary tests with loading rates between 0.1 and 1 mm/mim.

The test results of the fracture surfaces and the mechanical data substantiate the character of the oxide ceramic composite materials according to the invention which was produced here by way of example.

BRIEF DESCRIPTION OF THE DRAWINGS

The Figs. show as an example fracture surfaces of composites whose sapphire fibers had been coated with 0.6 and 1.2 μm thick Sr aluminate layers:

FIG. 1 No longer fiber separation from the matrix during fracture at room temperature, the fibers (coating thickness 1.2 μm) fracture in almost the same plane as the surrounding matrix (minimum pull-out lengths ≦100 μm).

FIG. 2a/b The greater enlargement of the fracture surface produced at room temperature shows: the strengthening effect of the coated fibers (coating thickness 1.2 μm) in the temperature range of brittle material behavior (see table below) is associated with locally neighboring (i) microscopic areas of the fiber/matrix interface which are still firmly sintered after the fracture (preventing longer fiber separation from the matrix), and (ii) microscopically locally limited crack formation (energy dissipative influence of the brittle fracture with an effect e.g. of increased strength or improved thermal shock resistance).

FIG. 3 No considerable pull-out effect occurs even in the upper temperature range of brittle material behavior (example here 900° C.; coating thickness 1.2 μm).

FIG. 4a/b Fracture surface 1200° C. (similarly at 1400° C.): even at very high temperature a mesoscopically strong fiber/matrix bond is realized for fiber coatings that lead to oxide ceramic composite materials according to the invention (in theexample with 0.6 thick Sr aluminate coating), which bond withstands the macroscopic fracture without longer fiber separation from the matrix (similar result also with 1.2 μm thick fiber coating).

Mechanical tests were used to explore the behavior of the oxide ceramic fiber composite materials under the effect of temperature.

The following table shows the desired positive effect of the fibers with coating and with optimized for this coating sintering on brittle fracture (which is addressed e.g., by thermal shock in the temperature range between 20 and 1000° C.); the data refer to a structure with 0.6 μm average matrix grain size:

|  | Strength at room temperature | Strength at 900° C. |
|---|---|---|
| Fiber-free material (not according to the invention) | 530 MPa | 490 MPa |
| Composite material with Sr aluminate-coated sapphire fibers; average results for layer thicknesses of 0.6 and 1.2 μm | 790 MPa | 520 MPa |

At very high temperature, however, brittle fracture behavior and thermal shock resistance are less important; what is primarily important here is a strong fiber/matrix bond as prerequisite for an adequate long-term shape stability of the component. Whereas at 1200–1400° C. the microscopic strength of the interfaces and the absence of pull-out mechanisms is proven in FIG. 4*a*/*b*, the following table shows the constancy of the macroscopic strength between 1200 to at least 1400° C. for the example of the composite materials with a matrix grain size of 6 μm regardless of the thickness of the fiber coating in the tested area (similar data also for matrix with 14.5 μm grain size):

|  | Strength at 1200° C. | Strength at 1400° C. |
|---|---|---|
| Fiber-free material (not according to the invention | 270 MPa | 160 Mpa |
| Composite material with Sr aluminate-coated sapphire fibers; average results for layer thickness of 0.15, 0.3, 0.6 and 1.2 μm | 220 MPa | 220 Mpa |

What is claimed is:

1. Oxide ceramic fiber composite material containing fibers with a segmented monocrystalline structure with an average coherence length of $\geq 150$ μm, with a mesoscopically strong fiber-matrix interface along the fiber axis at a high temperature, which interface on loading above room temperature in a way associated with propagation of macrocracks shows delaminations that in their extension along the fiber axis are microscopically locally limited to values smaller than the average fiber coherence length and thereby limited to a maximum of 200 μm.

2. Oxide ceramic fiber composite material according to claim 1, containing coated fibers with a thickness of interface material of less than 2 μm.

3. Components and/or installations for long-term use at high temperatures comprising the oxide ceramic fiber composite material according to claim 1.

4. Components and/or installations for long-term use at repeatedly changing high temperatures comprising the oxide ceramic fiber composite material according to claim 1.

5. Components and/or installations for energy conversion or for high-performance brake disks comprising the oxide ceramic fiber composite material according to claim 1.

6. Oxide ceramic fiber composite material according to claim 1, wherein said high temperature is above 1000° C.

7. Oxide ceramic fiber composite material according to claim 2, wherein said high temperature is above 1000° C.

* * * * *